Feb. 16, 1926.
C. BELCHER
1,573,511
ADJUSTABLE FLANGE FOR PIPE LINES
Original Filed Jan. 31, 1923
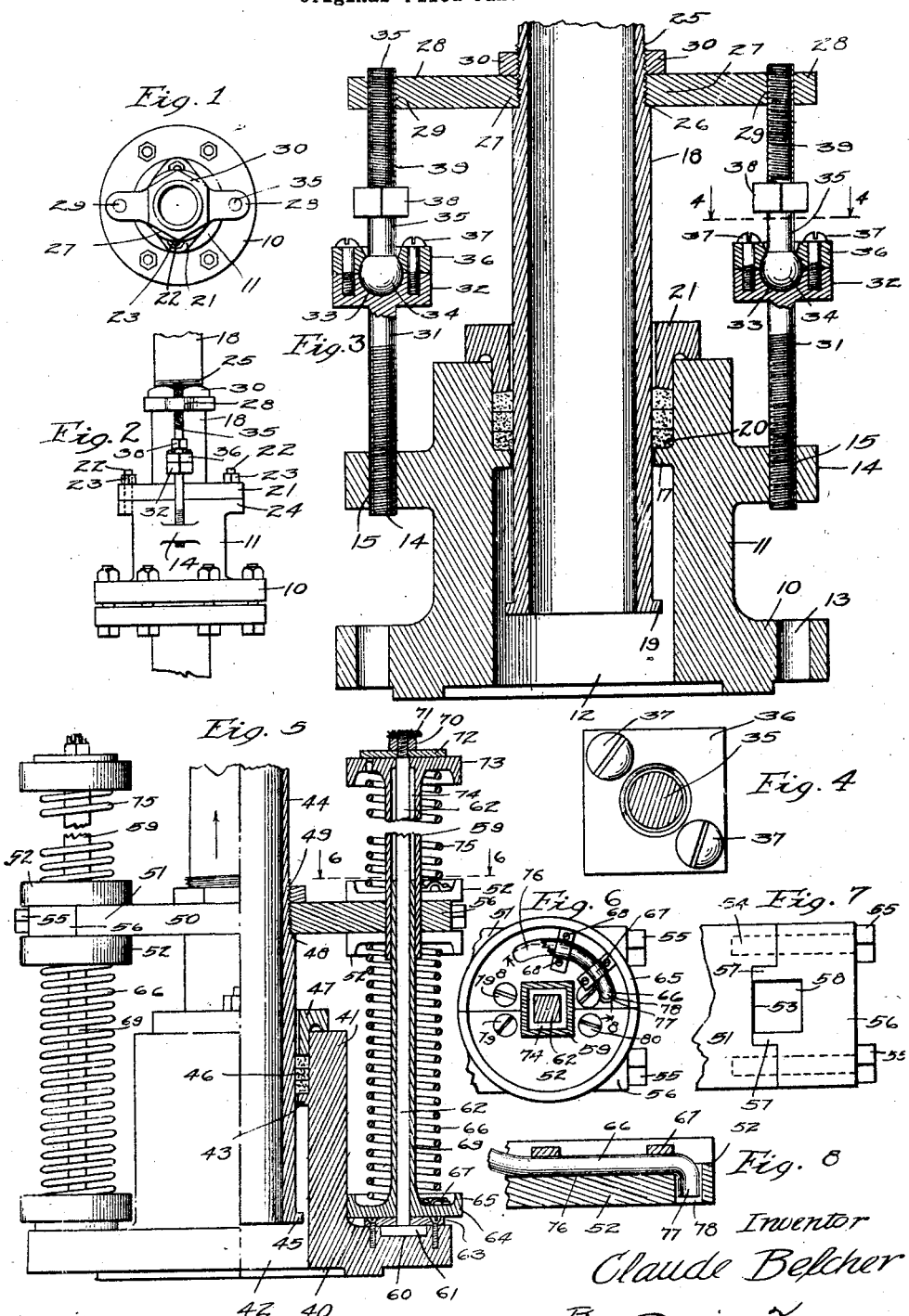
Inventor
Claude Belcher
By Bair & Freeman
Attys
Witness
Lynn Latt Patented Feb. 16, 1926.

1,573,511

UNITED STATES PATENT OFFICE.

CLAUDE BELCHER, OF DES MOINES, IOWA, ASSIGNOR OF FORTY-NINE PER CENT TO FRANK J. DOUGLAS, OF DES MOINES, IOWA.

ADJUSTABLE FLANGE FOR PIPE LINES.

Application filed January 31, 1923, Serial No. 616,000. Renewed January 11, 1926.

*To all whom it may concern:*

Be it known that I, CLAUDE BELCHER, a citizen of the United States, and a resident of Des Moines, in the county of Polk and State of Iowa, have invented a certain new and useful Adjustable Flange for Pipe Lines, of which the following is a specification.

The purpose of my invention is to provide for a pipe line an adjustable flange structure of simple, durable and inexpensive construction.

A further object of my invention is to provide such a device, having parts so constructed and arranged as to greatly reduce the time and labor necessary for installation over other structures and methods, which have been used heretofore.

A further object is to provide such a flange, which will reduce the strain on the parts, due to contraction and expansion and thus reduce the likelihood of breaking or bending the parts.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a top or plan view of an installed flange embodying my invention.

Figure 2 shows a side elevation of the same.

Figure 3 shows a vertical, central, sectional view through the structure.

Figure 4 shows a horizontal, sectional view taken on the line 4—4 of Figure 3.

Figure 5 shows a side elevation partly in vertical section of another form in which my invention may be embodied.

Figure 6 shows a horizontal, sectional view taken on the line 6—6 of Figure 5.

Figure 7 shows a plan view, parts being broken away of part of the structure; and Figure 8 shows a detailed, sectional view taken on the line 8—8 of Figure 6.

In the accompanying drawings, I have used the reference character 10 to indicate generally what I may call a flange for an adjustable pipe. The flange or base portion 10 has a tubular extension or hub 11.

It will be understood that a passage 12 extends entirely through the flange 10 and the hub 11.

The flange 10 has suitable holes 13 for receiving fastening bolts. On the outside of the tubular extension or hub 11 are oppositely extending ears or lugs 14, provided with screw-threaded holes 15 extending through them. The holes 15 are arranged with right-hand screw-threads for the purpose which will be hereafter more fully explained.

On the inside of the tubular extension or hub 11 spaced from the ends thereof is an annular packing rest 17. The extension or hub 11 is designed to receive the end of a machine steam pipe 18, which on its end received within the hub 11 has an annular flange 19, which is a safety device for preventing the accidental withdrawal of the pipe 18 from the hub 11. The flange 19 would engage against the packing rest 17 in case the tension rods, which will be hereinafter more fully described, should break or otherwise become accidentally released.

Resting on the packing rest 17 and surrounding the pipe 18 are suitable rings of packing 20. The packing 20 is held in place by a stuffing gland 21, which is secured in position by means of stud bolts 22 and nuts 23 thereon.

The hub 11 has on opposite sides the extensions 24 to receive the stud bolts 22, as illustrated in Figure 2.

The outer end of the pipe 18 is reduced for a portion of its length down to extra-heavy and is screw-threaded as at 25.

It will be noted that at the lower end of the screw-threads is an annular shoulder 26.

Screwed onto the threads 25 is a threaded collar 27, having opposite wings 28, which are provided with left-hand screw-threads 29. Above the collar 27 is a lock nut 30.

I provide two tension rods for adjustably connecting the pipe 18 with the flange 10 and hub 11. Screwed into the holes in the ears 14 are tension rods 31, having on their upper ends heads 32 formed with recesses 33 to receive the lower half of bolts 34 on the lower end of the upper tension rods 35.

A cap 36 is secured to the head 32 by means of stud bolts 37, and is so shaped as to retain the bolt 34 in place, but to permit side play of the tension rod 31, the upper end of which is screwed into the wing 28 on the collar 27.

The tension rod 35 has a hexagonal portion 38 formed thereon to receive a wrench.

The tension rod just described is duplicated on the opposite side of the pipe 18.

It will, of course, be understood that the screw-threads 39 on the tension rods 35 are left-hand to correspond with the screw-threads 29.

It will be seen that with the structure herein described, it is much easier to install the pipe 18, because that pipe may be installed, even if it is a little out of true alignment with the passage 12 and the flange 10 and the hub 11.

The ball and socket connection between the tension rods 35 and 31 allows enough lateral play of the pipe 18 with relation to the flange to greatly facilitate the assembling of the parts, and also to greatly reduce the strain on the parts after they have been installed in position.

It will be obvious that by applying wrenches to the portions 38, the tension rods may be adjusted for adjusting the pipe 18 longitudinally with relation to the flange 10.

In Figures 5, 6, 7 and 8, I have shown a slightly different form of my invention.

The flange 40 has the upwardly extending tubular hub or extension 41. Extending through the flange 40 and the hub 41 is a passage 42. On the inside of the hub 41 is a packing rest 43, similar in construction to the packing rest 17.

The pipe 44, similar in general construction to the pipe 18, has one end received in the hub 41. On the inner end of the pipe 44 is a flange 45. Resting on the packing rest 43 are rings of packing 46, which are held in position by means of a stuffing gland 47, which is similar in construction and method of mounting on the hub 41 to the stuffing gland 21.

The pipe 44 has the shoulder 48 similar to the shoulder 26, and the screw-threads 49 similar to the screw-threads 25. Screwed onto the threads 49 is a collar 50, having opposite laterally extending wings 51, as illustrated in Figures 5 and 7.

The wings 51 are wider than the wings 28 in order to furnish a proper seat for the spring reception cups 52, hereinafter referred to.

The outer ends of the wings 51 have formed therein recesses 53 and screw-threaded holes 54 to receive a screw-threaded bolt 55. The bolts 55 are extended through the member 56, which has arms 57, projecting into the recesses 53.

Between the arms 57 is a recess 58 to form a guide for the automatic extension sleeve 59.

In the flange 50 are recesses 60 to receive the heads 61 of a square guide rod 62, which extends through the opening 58 and substantially beyond, as shown in Figure 5.

The length of the rod 62 is substantially the same on both sides of the wing 51. The head 61 is held in place by a bearing plate 63 on which rests a reception cup 64. The reception cup 64 comprises an annular disc with an annular peripheral rib 65. A coil spring 66 has one end secured to the reception cup 64 by means of clamps 67, which are fastened in place by means of small screws 68.

Formed on the reception cup 64 and receiving the rod 62 is a square sleeve 69. The sleeve 69 receives and fits the guide rod 62 and projects above the wing 51.

On the outer end of the guide rod 62 is a nut 70, which may be a castellated nut and locked in position by means of a cotter pin 71, extended through a suitable hole in the rod 62.

Adjacent to the nut 70 and threaded onto the screw-threaded end of the rod 62, which receives the nut 70 is a bearing plate 72. Adjacent to the bearing plate 72 is a reception cup 73, similar in construction to the reception cup 64.

Formed on the reception cup 73 is the sleeve 59, which projects through the opening 58 and telescopically receives the end of the sleeve 69, as shown in Figure 5.

It will be understood that between the end of the sleeve 69 and the reception cup 73, there is a space 74 between the sleeve 59 and the rod 62. The square hole in the reception cup 73, however, which receives the rod 62, is faced to snugly fit the rod, as shown in the drawing.

Secured to the reception cup 73 is a spring 75, which is fastened to the reception cup 73 in the same way that the spring 62 is secured to the cup 64. One end of the spring 66 for instance is received in a spring track 76 in the reception cup 64, and the extreme end of the spring 66 is bent, as at 77 and received in the hole 78 in the reception cup 64.

Above the wing 51 is a reception cup 52 of slightly different form than that of the cups 64 and 73.

The reception cups 52 are made in two halves separated along a transverse, central line, which is arranged lengthwise of the wing 51, as shown for instance in Figure 6, so that the joint between the halves of the reception cup 52 is arranged at right angles to the joint between the wing 51 and the member 56 for giving the parts greater strength.

Each half of the reception cup 52 has a bolt 79, whereby it is secured to the wing 51, and a screw bolt 80, whereby it is secured to the member 56.

The end of the spring 66 is secured to one of the reception cups 52, by means of clamps 67, already described, and similarly the end of the spring 75 is secured to the other reception cup 52.

It will be understood that the tension device just described is duplicated on the opposite side of the pipe 44.

It will be seen that the reception cups 52 and the springs 66 and 75 are fixed to the wings 51. Thus, if great pressure should be exerted on the pipe 44 in the direction indicated by the arrow in Figure 5, the pipe 44 could give a little in that direction.

The spring 75 would be compressed and the spring 66 and the cup 64 might move away from the bearing plate 63. When the pressure on the pipe 44 is relieved, the tension of the spring 75 will return the parts to normal.

Similarly, if pressure should be imposed on the pipe 44 for moving it in the direction opposite that indicated by the arrow in Figure 5, the pipe could move in that direction, compressing the springs 66, but when the undue pressure on the pipe 44 should be removed, the springs would again return the parts to their normal position.

It will be observed from the description of the device now under consideration that contraction and expansion, which might move the pipe 44 in either direction lengthwise, will be automatically compensated or taken care of by means of the springs and the method of mounting the pipe 44 on the flange 40.

The device shown in Figures 5 to 8 inclusive has the advantage of being easily installed in addition to the advantage of automatic compensation just mentioned.

A device of this kind does away with the necessity for using big U-joints on large header pipes and pump lines. The strain on the parts is minimized by the automatically compensating device herein described, and thus the likelihood of breakage is reduced, and the wear on the parts is reduced with a consequent saving in expense.

Some changes may be made in the construction and arrangement of the various parts of my device, without departing from the essential features and purposes of my invention, and it is my intention to cover by my claims, any modified forms of structure, or use of mechanical equivalents, which may be reasonably included within their scope.

I claim as my invention:

1. In a device of the class described, a flange having a central opening and a tubular extension provided with an interior packing rest, a pipe projected into said extension, a packing connection between the pipe and the extension, a collar having a screw-threaded connection with the pipe and diametrically opposite projecting arms, rods fixed to said flange and projecting slidably through said arms springs received on said rods between said arms and said flanges and between said arms and retaining flanges secured to the ends of said rods.

2. In a device of the class described, a flange having a tubular extension or hub, a pipe of smaller diameter than the opening in said extension, having one end received therein, an annular packing received in said extension, thereby forming a packing connection between the pipe and the extension, projecting members on the pipe, rods fixed to said flange and projecting through the extensions on the pipe, telescoping sleeves mounted on said rods, sleeve retaining devices on the rods, and springs on said sleeves above and below the extensions.

Des Moines, Iowa, January 24, 1923.

CLAUDE BELCHER.